(12) United States Patent
Rizzi

(10) Patent No.: US 10,406,495 B2
(45) Date of Patent: Sep. 10, 2019

(54) WALL FOR CATALYTIC BEDS OF REACTORS AND METHOD FOR REALIZING THE SAME

(71) Applicant: Casale SA, Lugano (CH)

(72) Inventor: Enrico Rizzi, Casnate con Bernate (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/311,932

(22) PCT Filed: Apr. 20, 2017

(86) PCT No.: PCT/EP2017/059349
§ 371 (c)(1),
(2) Date: Dec. 20, 2018

(87) PCT Pub. No.: WO2017/220232
PCT Pub. Date: Dec. 28, 2017

(65) Prior Publication Data
US 2019/0209990 A1    Jul. 11, 2019

(30) Foreign Application Priority Data

Jun. 22, 2016 (EP) .................................... 16175739

(51) Int. Cl.
*B01J 8/00* (2006.01)
*B01J 8/02* (2006.01)

(52) U.S. Cl.
CPC ............. *B01J 8/008* (2013.01); *B01J 8/0214* (2013.01); *B01J 8/0278* (2013.01);
(Continued)

(58) Field of Classification Search
CPC ........ B01J 8/0214; B01J 8/0278; B01J 8/008; B01J 8/0085; B01J 2208/00884; B01J 2208/00814; B01J 2208/00938
See application file for complete search history.

(56) References Cited

U.S. PATENT DOCUMENTS 2,886,517 A * 5/1959 Patton .................... B01J 8/0214
208/134
5,250,270 A    10/1993 Noe

FOREIGN PATENT DOCUMENTS

EP    1 818 094 A1    8/2007
EP    3 037 165 A1    6/2016

OTHER PUBLICATIONS

International Search Report issued in connection with PCT/EP2017/059349.

(Continued)

*Primary Examiner* — Lessanework Seifu
(74) *Attorney, Agent, or Firm* — Akerman LLP

(57) ABSTRACT

Catalytic chemical reactor comprising a perforated wall (6) adjacent to a supporting wall of the reactor or of a catalytic cartridge contained in the reactor, wherein said perforated wall comprises a plurality of panels (7) and comprises first sectors (9) resting on the supporting wall and second sectors (10) spaced from said supporting wall defining a cavity (11), and wherein means are provided for local securing said gas-permeable wall to said supporting wall, said securing means comprising: a plurality of support elements (13) fixed to the supporting wall (4) and passing through respective openings (15) of the first sectors (9) of the gas-permeable wall and a respective plurality of locking elements (14) which can be associated with the said support elements, the panels of the gas-permeable wall being gripped between said supporting wall and said locking elements.

14 Claims, 7 Drawing Sheets

(52) U.S. Cl.
CPC .............. *B01J 2208/00814* (2013.01); *B01J 2208/00884* (2013.01); *B01J 2208/00938* (2013.01)

(56) References Cited

OTHER PUBLICATIONS

International Preliminary Report on Patentability issued in connection with PCT/EP2017/059349.

\* cited by examiner

WALL FOR CATALYTIC BEDS OF REACTORS AND METHOD FOR REALIZING THE SAME This application is a national phase of PCT/EP2017/059349, filed Apr. 20, 2017, and claims priority to EP 16175739.8, filed Jun. 22, 2016, the entire contents of both of which are hereby incorporated by reference.

FIELD OF APPLICATION

The invention relates to the technical field of catalytic chemical reactors. In particular, the invention relates to a technique for realizing a gas-permeable wall.

PRIOR ART

A catalytic chemical reactor contains at least one catalytic bed, which may be hosted in a catalytic cartridge.

A catalytic reactor requires gas-permeable walls (e.g. a perforated wall) to distribute gaseous reactants to the catalytic bed, or collect reaction products from the catalytic bed.

The realization of a gas-permeable wall inside a vessel is challenging from a technological point of view. In particular, the realization of the perforated wall is often performed as part of an operation for modernizing or revamping an existing reactor, which means that a series of constraints imposed by the features of the existing reactor must be respected. For example, if the reactor is of the partially open type (i.e. has no flange with a size equal to the diameter and is internally accessible only via a relatively small manhole), the perforated wall must be divided up into sectors small enough for them to be introduced into the reactor and must be assembled inside the reactor itself.

In reactors with a catalytic cartridge, the cartridge comprises a supporting cylindrical wall for holding the catalyst, and a gas-permeable wall for distributing or collecting gas may be inside the cartridge and form a double-wall system together with said supporting wall of the cartridge. For example, it is known to realize an outer collector for a radial-flow reactor by means of a second wall having a surface at least partially perforated, so as to be gas-permeable, and being spaced from the peripheral supporting wall of the cartridge, so as to form a cavity between the two walls.

A catalytic reactor comprising a shell and a catalytic cartridge is described in U.S. Pat. No. 5,250,270.

EP 3 037 165 of the same applicant describes a perforated collector made of a plurality of flexible and deformable panels which can introduced through a manhole. The wall resulting from the assembly of said panels is not self-supporting and rests on a supporting wall of the reactor itself. Said supporting wall for example is formed by a wall of the catalytic cartridge.

Therefore, a suitable wall, such as the wall of the catalytic cartridge, can be used as a structural load-bearing element. Thanks to this measure, the collector is freed from the need to support loads and can therefore be realized with light and flexible panels which can be folded and introduced into the available opening (manhole).

This solution is advantageous in particular for the operation of modernizing existing reactors, but a number of technical problems are still open. The panels which form the perforated wall are elements of a small thickness and length predominant over the other dimensions; consequently they are very flexible. It has been noted that the panels, once they are arranged adjacent to the supporting wall (for example the wall of the catalytic cartridge), bend significantly in their middle zone. This makes it difficult to arrange the panels correctly in the course of the wall assembly operation. Moreover, as a result of the bending, there are panel zones which no longer rest on the supporting wall and therefore are not supported. The introduction of the catalyst mass may cause distortion of the panels in these unsupported zones.

In view of the above, the realization of gas-permeable walls or of double-wall systems in a catalytic reactor constitutes a technical problem which has not yet been entirely solved.

SUMMARY OF THE INVENTION

The invention aims to improve the aforementioned technology for realizing perforated walls inside a chemical reactor, by means of panels resting on a supporting wall. Said supporting wall may be a shell of the reactor or a wall of a catalytic cartridge contained within the reactor. The supporting wall is cylindrical or substantially cylindrical.

The object is achieved with a catalytic chemical reactor according to the claims.

An aspect of the invention is a chemical reactor comprising a catalytic bed and a gas-permeable wall facing the catalytic bed, wherein:

said gas-permeable wall comprises a plurality of panels and each of said panels extends over an angular sector of said permeable wall;

the gas-permeable wall comprises first wall sectors which bear against a supporting wall adjacent to the gas permeable wall, and second wall sectors which are spaced from said supporting wall, the first sectors and the second sectors alternating with each other along the circumferential extension of the permeable wall;

said second wall sectors comprise passages for a gas;

the reactor further comprising local securing means of said gas-permeable wall to said supporting wall, said securing means comprising:

a plurality of supports firmly fixed to the supporting wall and passing through respective openings of the first of the gas-permeable wall;

a respective plurality of locking elements which can be associated with said supports, the panels of the gas-permeable wall being clamped between said supporting wall and said locking elements.

The supporting wall can be a shell of the reactor or a wall of a catalytic cartridge, if provided.

Therefore, another aspect of the invention is a reactor comprising a shell and a catalytic cartridge inside the shell, said catalytic cartridge having a cylindrical or substantially cylindrical supporting wall, the reactor comprising at least one gas-permeable wall arranged adjacent to said supporting wall of the cartridge, wherein:

said gas-permeable wall comprises a plurality of panels, each of said panels forming an angular sector of said permeable wall;

said gas-permeable wall comprises useful surfaces, which are spaced from said supporting wall, defining an interspace between the two walls, and which are perforated so as to allow the passage of gas, and also comprises a plurality of bearing ribs which protrude from said useful surfaces abutting against said supporting wall;

the reactor comprises securing means between the panels of said gas-permeable wall and said supporting wall, said securing means comprising:

a plurality of supports firmly fixed to the supporting wall and passing through respective openings of said bearing ribs, and a respective plurality of locking elements which can be associated with said supports, wherein the panels of the gas-permeable wall are clamped between said supporting wall and said locking elements, when the locking elements are associated with said supports.

A catalytic cartridge has the advantage of leaving a free space between the catalyst and the outer shell of the reactor. This free space can be traversed by a cooling medium, e.g. the fresh charge under pre-heating to avoid the outer shell from being directly stressed by the hot catalyst. In some cases however the catalytic cartridge is not necessary, for example shift reactors may not include a cartridge. When the reactor includes a catalytic cartridge, the above mentioned supporting wall is preferably a wall of the cartridge. When the reactor does to include a cartridge, the above mentioned supporting wall is the outer shell of the reactor.

The supporting wall and the gas-permeable wall obtained from joining together of the said panels are coaxial. The axis of the supporting wall and of the permeable wall is parallel to (preferably coincides with) the axis of the shell of the reactor itself. The permeable wall has a substantially cylindrical configuration so as to follow the supporting wall on which it rests. The supporting wall and the permeable wall thus form together a double wall.

The gas-permeable wall, when assembled, forms a single unit which contains and delimits the entire catalyst mass. The gas-permeable wall operates as a collector or distributor of gases directed towards the catalytic bed or respectively flowing out from the catalytic bed.

The wall gas-permeable wall is the result of assembly of a plurality of panels. Preferably said panels have edges which are at least partially superimposed in the region of the bearing sectors.

The term of bearing ribs in the description and claims denotes ribs, reliefs or more generally bearing portions, which may have different configurations, while remaining within the scope of the present invention.

Said ribs may comprises two inclined surfaces, which converge towards the supporting wall, and optionally a flat surface abutting against the supporting wall. According to preferred embodiments, said ribs have a substantially V-shaped or trapezoidal cross-section along a sectional plane perpendicular to the axis of the wall.

When the ribs have a V-shaped or trapezoidal cross-section, the locking elements are advantageously formed so as to engage the cross-section of the ribs in a wedge-like manner.

When the ribs comprise a flat surface resting on the supporting wall, the locking elements are preferably in the form of flat plates.

Advantageously, the engagement between the supports fixed to the supporting wall and the respective openings of the bearing ribs is such as to allow a certain movement of the gas-permeable wall with respect to the supporting wall. Even more preferably, said freedom of movement is permitted at least in the axial direction. In a preferred embodiment, the aforementioned openings have the form of eyelets elongated in the axial direction.

Each rib has preferably a bottom (lowest) opening matching a respective support with a precise engaging fit, at least in the axial direction, so as to provide a fixed point in relation to vertical displacement of the panel.

In a particularly preferred embodiment, said supports are threaded pins welded to the supporting wall. Said locking elements have a hole for engagement with said threaded pins and are locked for example by means of a nut.

Preferably, a plurality of locking elements are provided along each rib. The locking elements for example are equally spaced along the axial direction, i.e. along a generatrix of the supporting wall.

The useful surfaces of the gas-permeable wall can have, for example, a substantially flat profile, a triangular profile, an arc-shaped profile, or other forms. The perforations for allowing the passage of gas and obtaining the desired permeability may consist in some embodiments of circular holes or openings with an elongated form.

Advantageously, the gas-permeable wall is made of stainless steel or, where necessary, an alloy with a high nickel content, such as alloys known by the trademark Inconel.

According to preferred embodiments, the gas-permeable wall has a thickness of 1 mm to 3 mm, more preferably of 1 mm to 1.5 mm. In some embodiments the suitable thickness of the gas-permeable wall is determined as a function of internal diameter of the vessel, because the larger the vessel, the greater the stress induced by the catalyst. In a preferred embodiment, particularly for reactors for the synthesis of ammonia, the thickness of the gas-permeable wall is about $1/1000$ of said diameter, for example in a vessel having internal diameter of 3 m the gas permeable wall is about 3 mm thick.

In some embodiments, the panels are reinforced so as to withstand the vertical loads and avoid problems of instability. The panels can be reinforced for example with sheet metal strips having a suitable thickness, preferably greater than the thickness of the panels (for example 3 mm or 5 mm). Preferably, the reinforcements against vertical loads (where provided) are located along the bearing ribs so as not to affect the flexibility of the panels, and even more preferably they extend over a certain distance starting from the bottom end of the panels (where the vertical load is maximum).

The invention also relates to a method for realizing a gas-permeable wall inside a chemical reactor comprising a catalytic cartridge, according to the claims. In a further aspect of the invention, the method according to the invention is implemented in connection with the modernization or revamping of an existing chemical reactor.

The invention is applicable to chemical reactors of various types such as, by way of example, reactors for ammonia synthesis, reactors for methanol synthesis or shift reactors.

The invention provides essentially the following advantages:

The positioning of the gas-permeable wall panels is facilitated by the fact that the panels are secured to the supporting wall by means of said locking elements. In particular, the presence of several locking elements along the axial direction (generatrix) prevents bending of the panels and keeps them aligned with the supporting wall. In this way the panels which are already positioned do not hinder the assembly of the following panels. Moreover, the set of panels remains in close contact with the supporting wall and consequently no zone of the panels is bent inwards and therefore subject to distortion or breakage during introduction of the catalyst mass. The assembly is very quick and does not require special equipment.

Another advantage of the invention is that the locking elements abut against the ribs, i.e. against gas-permeable wall sectors which are in direct contact with the supporting wall. This configuration is advantageous from a structural point of view because the stress due to the radial thrust of the catalyst is maximum along the centre line between two bearing points, while being minimum on the bearing points themselves.

The axial sliding movement of the gas-permeable wall with respect to the supporting wall has the further advantage that it allows a certain settling during assembly and compensation for the different thermal expansion of the supporting wall and the gas-permeable wall.

The advantages of the invention will emerge even more clearly with the aid of the detailed description which follows and relates to a number of preferred embodiments of the invention.

DETAILED DESCRIPTION OF A PREFERRED EMBODIMENT

Figure 1:
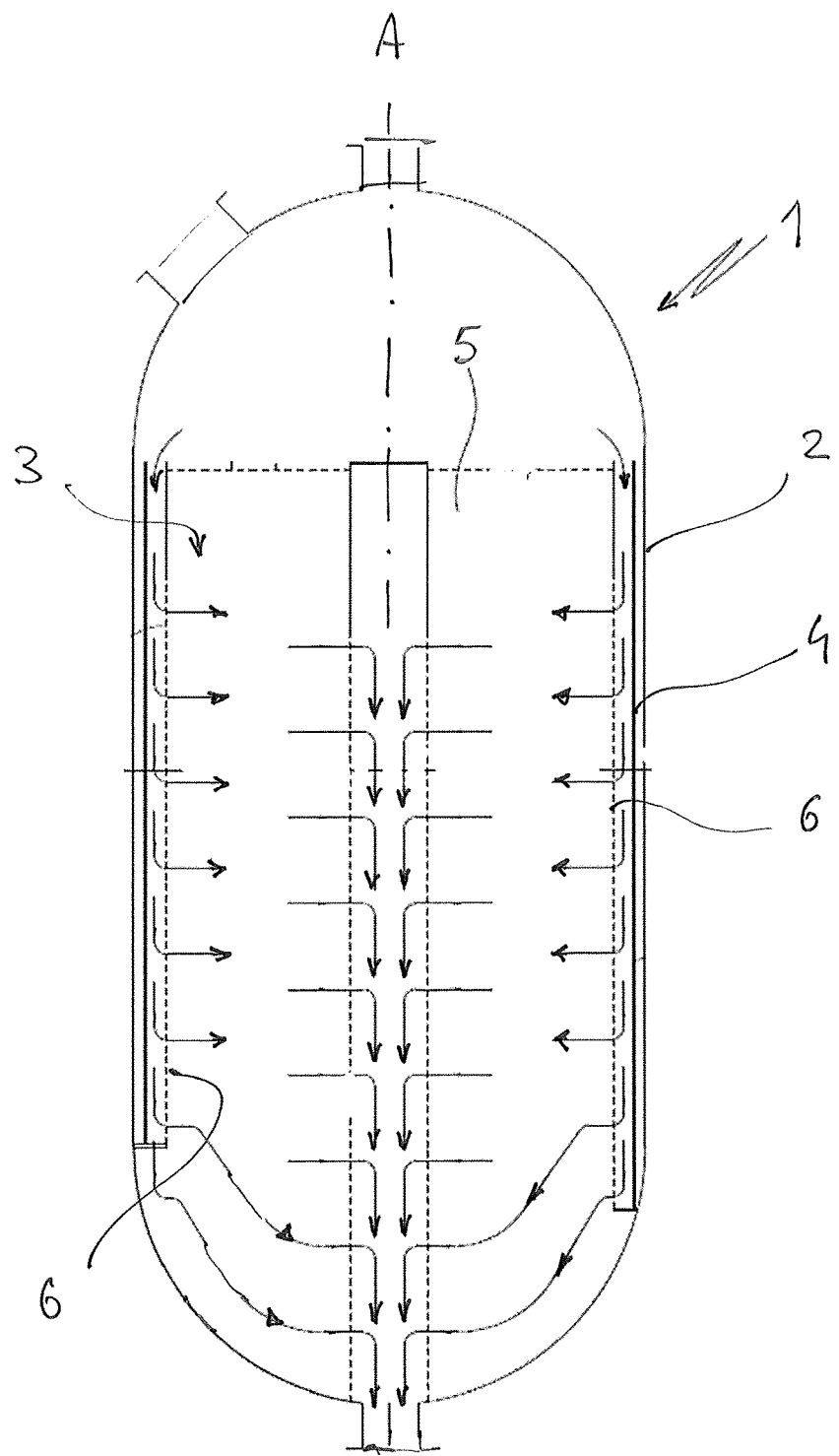
FIG. 1 shows a schematic cross-sectional view of a reactor according to an embodiment of the invention.

FIG. 1 shows schematically a catalytic chemical reactor 1 comprising a shell 2 and a catalytic cartridge 3 inside the shell 2. Said catalytic cartridge has a cylindrical supporting wall 4 and contains a catalyst mass which forms a catalytic bed 5.

The reactor further comprises a gas-permeable wall 6 which in the example acts as a distributor of gas into the catalytic bed 5.

The reactor design of FIG. 1 is inward radial-flow. The flow which passes through the catalytic bed 5 is indicated by the arrows in the figure. Such a reactor is known in the art and does not need to be described in detail.

The gas-permeable wall 6 (FIG. 2) essentially comprises a series of reliefs or ribs 9 which make a bearing contact against the supporting wall 4 of the catalytic cartridge and a series of useful surfaces 10 which are spaced from said supporting wall 4, defining an interspace 11 between the supporting wall 4 and the gas-permeable wall 6.

Figure 2:
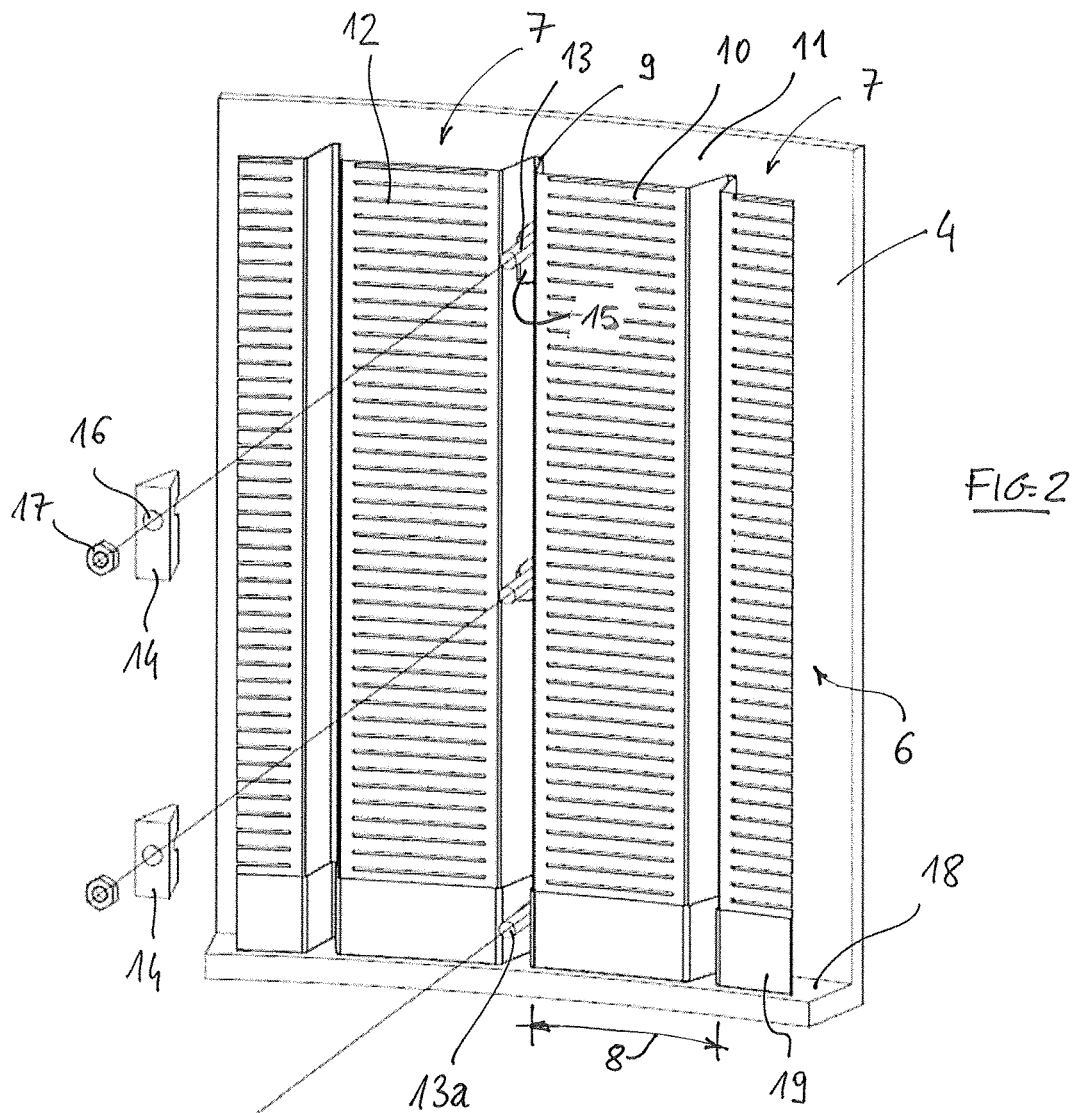
FIG. 2 shows partially a perforated wall adjacent to a supporting wall of a catalytic cartridge, according to an embodiment of the invention.

The ribs 9, according to the example of FIG. 2, have a substantially V-shaped cross-section. The useful surfaces 10 have a plurality of perforations, for example eyelets 12, for allowing the passage of gas.

As seen in the figure, each useful surface 10 is bounded by two adjacent ribs 9. The ribs 9 extend towards the wall 4 and come into direct contact therewith. The ribs 9 and the useful surfaces 10 alternate with each other with a repetition pitch denoted by the reference number 8 in FIG. 2.

The gas-permeable wall 6 is modular, namely comprises a plurality of panels 7 assembled together to form the wall 6 itself. FIG. 2 shows a portion of a panel 7.

Each of said panels 7 extends over a given angular sector of the wall 6. More precisely, each panel 7 extends in a circumferential direction over at least one pitch, namely comprises at least one rib 9 and a useful surface 10. A single panel 7 may extend in the circumferential direction over a plurality of pitches and consequently comprises a certain number of ribs 9 and useful surfaces 10.

In most cases the pitch 8 is advantageously comprised between 100 and 200 mm. A single panel 7 may have a width for example of about 1 meter. The number of panels 7 needed to complete the wall 6 (i.e. to cover the wall 4) depends on the diameter of the reactor, for example in a reactor with a diameter of 3 meters the wall 6 may require 8-10 panels.

During use, a gas stream fed into the cavity 11 passes into the catalytic bed through the permeable wall 6 (more precisely through the perforated sectors 10) or, vice versa, a stream flowing out from the catalytic bed is collected, through the wall 6, inside the interspace 11.

The reactor also comprises means for locally securing together the gas-permeable wall 6 and said supporting wall 4, which in the example comprise threaded pins 13 engaged with locking wedges 14.

The threaded pins 13 are welded to the supporting wall 4 and pass through openings 15 formed in the ribs 9. The wedges 14 are inserted in the V-shaped recesses defined by said ribs 9 on the inner side of the wall 6, that is the side facing the catalyst.

The wedges 14 preferably engage said V-shaped recesses with a contact between the side surfaces which creates a slight force-fit (wedge effect). The wedges 14 are locked with suitable means, for example each wedge 14 has a hole 16 which receives the pin 13 and is then fixed by means of a nut 17.

The head of the pin 13 is welded to the surface of the supporting wall 4. In this way, once the wedge 14 and the nut 17 have been positioned, the wall 6 and the associated panel 7 are secured to the supporting wall 4.

For each of the ribs 9 a plurality of locking elements (i.e. pins 13 and respective wedges 14) are preferably provided, being aligned along a generatrix of the supporting wall 4.

The panels 7 preferably have edges which are superimposed, for example along the ribs 9.

Figure 3:
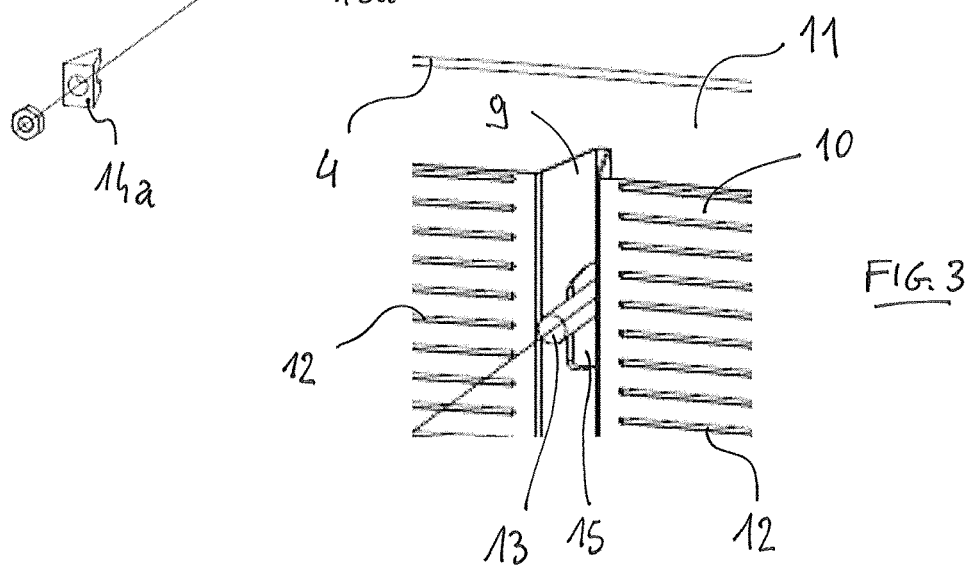
FIG. 3 is a detail of FIG. 2.

The eyelet 15, as seen more clearly in FIG. 3, extends in an axial direction so as to allow a certain relative sliding movement of the respective panel 7 and the supporting wall 4.

FIG. 2 shows the panels 7 resting on a support ring 18. Advantageously the engagement between the pairs of pins 13a and wedges 14a at lower height constitutes a locked rather than sliding engagement, so as to define a fixed constraining point for the permeable wall 6. More advantageously, a bottom strip 19 of the wall 6 is reinforced for example by folding over the metal sheet.

Figure 4:
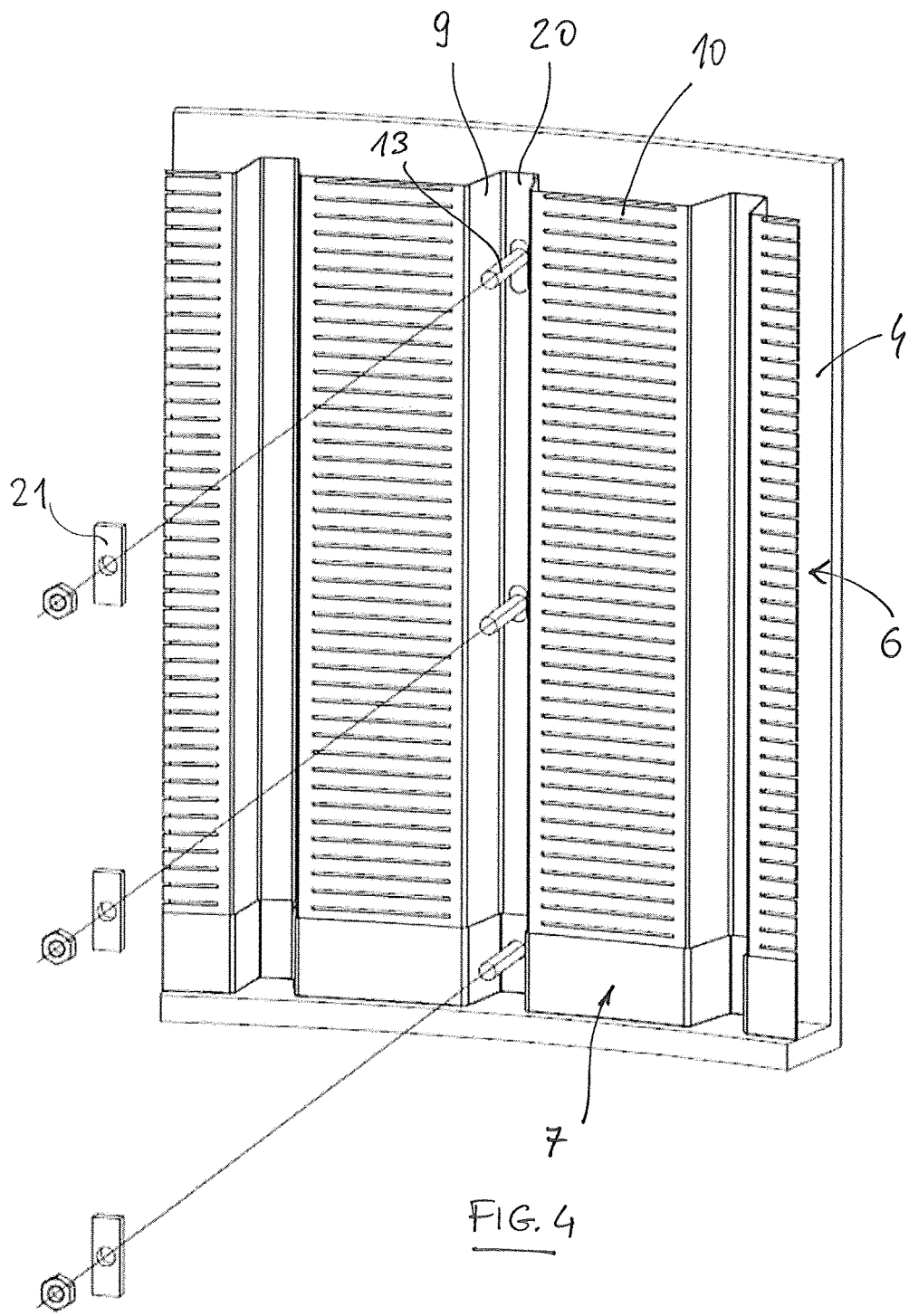
FIGS. 4, 5 and 6 show variant embodiments with respect to FIG. 2.

FIG. 4 shows a variant of the invention in which the ribs 9 comprise a flat surface 20 abutting against the supporting wall 4 and the locking elements are formed by flat plates 21.

The configuration with flat surface 20 is advantageous compared to a configuration with a V-shaped rib since it provides a larger space for the locking elements which may also be designed with a simpler shape, i.e. flat plates rather than wedges machined or made from folded sheet metal.

Figure 5:
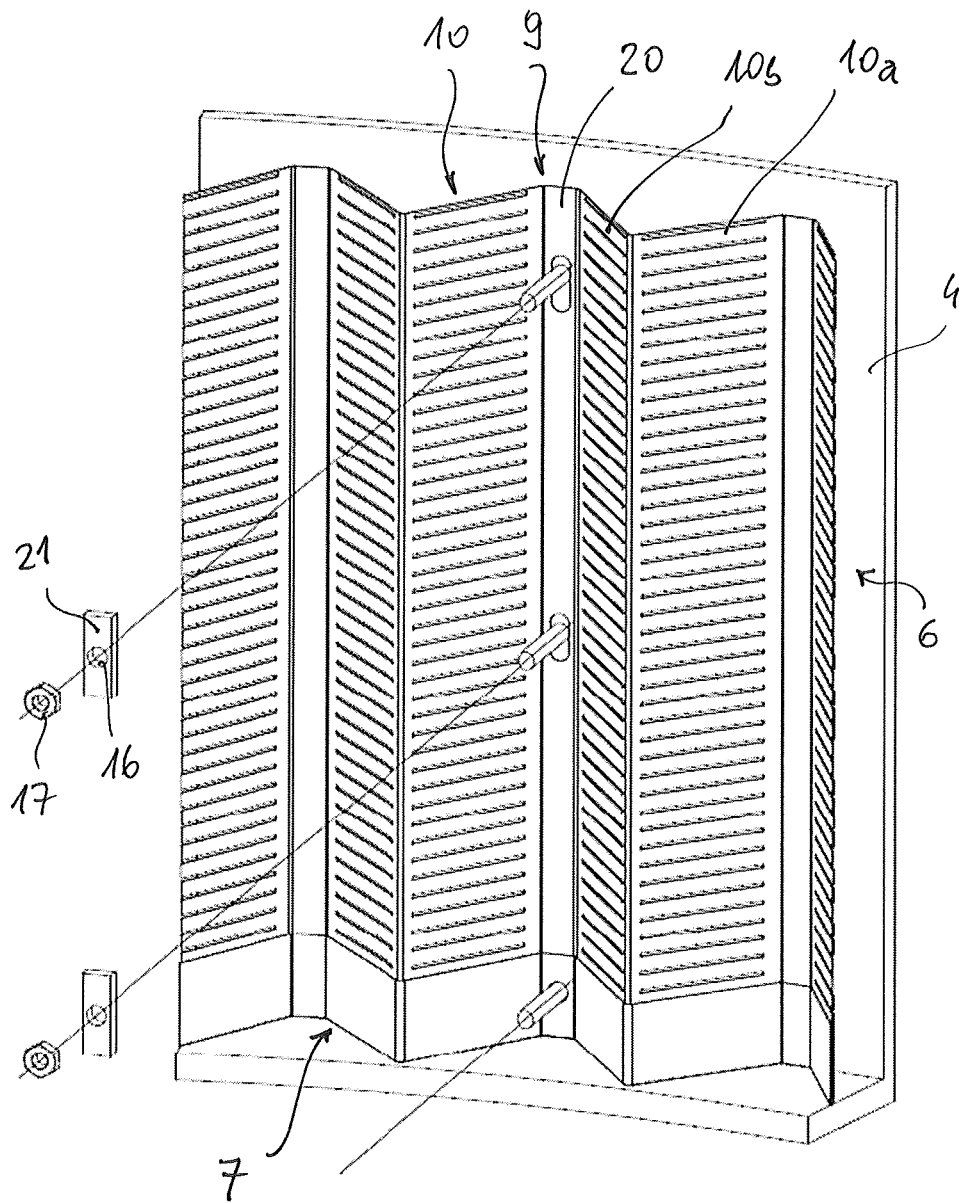

FIG. 5 shows a variant of the invention in which the panels 7 have a profile in the form of an isosceles triangle. The useful surfaces 10 consequently comprise two flat surfaces 10a, 10b which are angled relative to each other.

Figure 6:
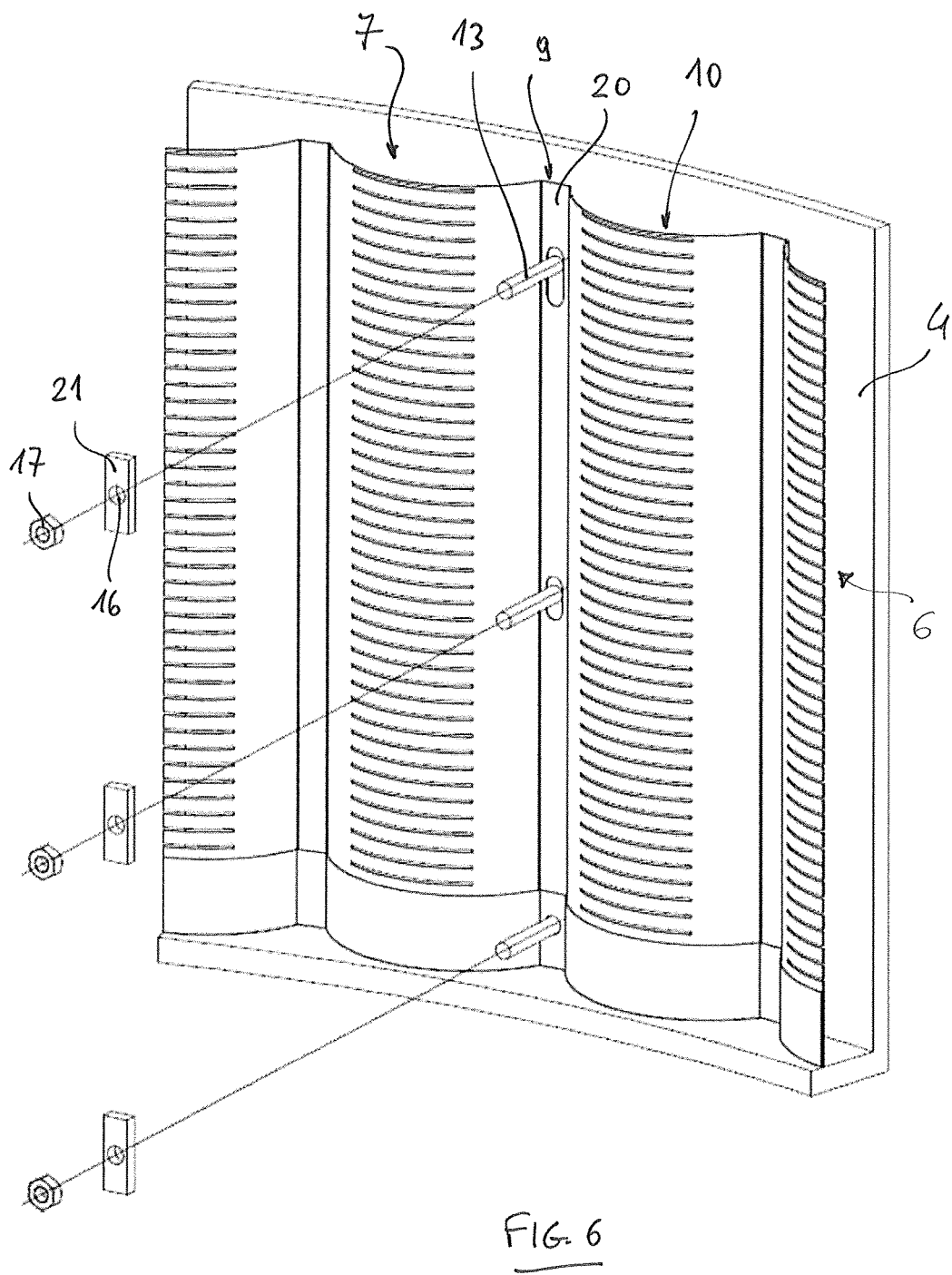

FIG. 6 shows a variant of the invention in which the panels 7 have a curvilinear profile, more advantageously in the form of a circular arc. The circular-arc profile may be preferred because it makes the best possible use of the strength of the material, i.e. it allows the panels 7 to have a minimum thickness, all the other conditions remaining the same. Moreover, for the same distance between adjacent ribs 9, the circular-arc profile offers the maximum useful surface area 10.

The embodiment shown in FIG. 6 is advantageous also from the point of view of the gas-flow cross section (in the form of a semicircle) between the supporting wall 4 and the panel 7. Said gas-flow cross section represents the cross section necessary for distributing uniformly the gas over the entire height of the catalytic bed or for collecting the gas at the outlet of the said catalytic bed.

The panels 7 are arranged alongside so as to form a wall 6 adjacent to the supporting wall 4 along the entire circumferential extension thereof. In some embodiments a special closing joint for the first and last panels may be provided.

Figure 7:
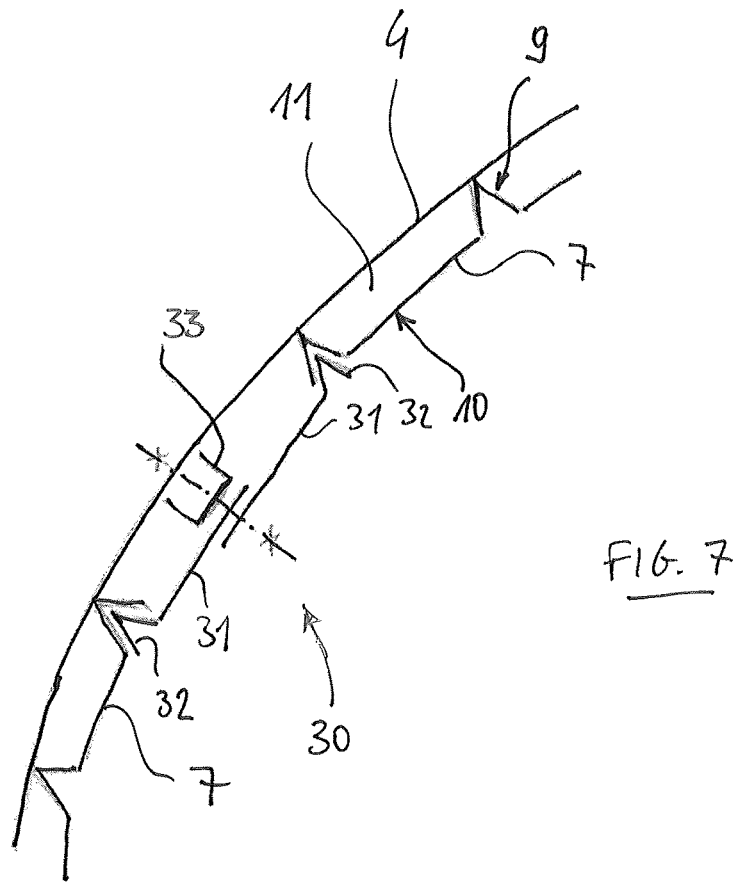
FIG. 7 illustrates an example of embodiment of a closing joint for a wall of the type shown in FIG. 3.

FIG. 7 shows an example of a closing joint for panels with V-shaped ribs of the type shown in FIG. 3.

This figure shows two end panels 7 (first and last panel) and a closing joint 30 comprising two elements 31 with a V-shaped end rib 32 which is superimposed on the ribs of the panels 7. The joint 30 further comprises a support piece 33 on which the elements 31 rest and are bolted.

Figure 8:
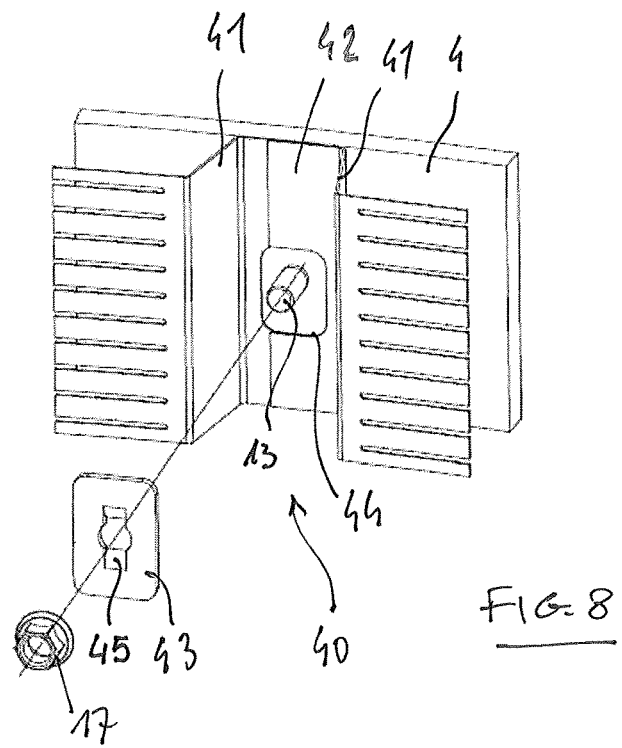
FIG. 8 illustrates an example of embodiment of a closing joint for a wall of the type shown in FIG. 4.

FIG. 8 shows an example of a closing joint 40 for panels with flat bearing surfaces of the type shown in FIG. 4. The two end panels 7 terminate in flanges 41 provided with eyelets 44; said eyelets 41 are superimposed in a zone 42 where a locking plate 43 substantially similar to the plates 21 is positioned. The plate 43 has preferably two teeth 45 for preventing excessive tightening of the wall 6. Excessive tightening in fact would not allow relative sliding of the perforated wall 6 and supporting wall 4.

Figure 10:
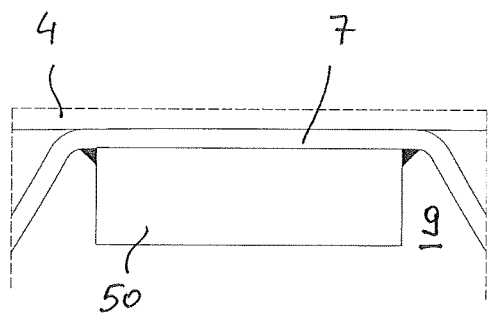
FIG. 10 shows a cross-section of a panel according to FIG. 9.
Figure 9:
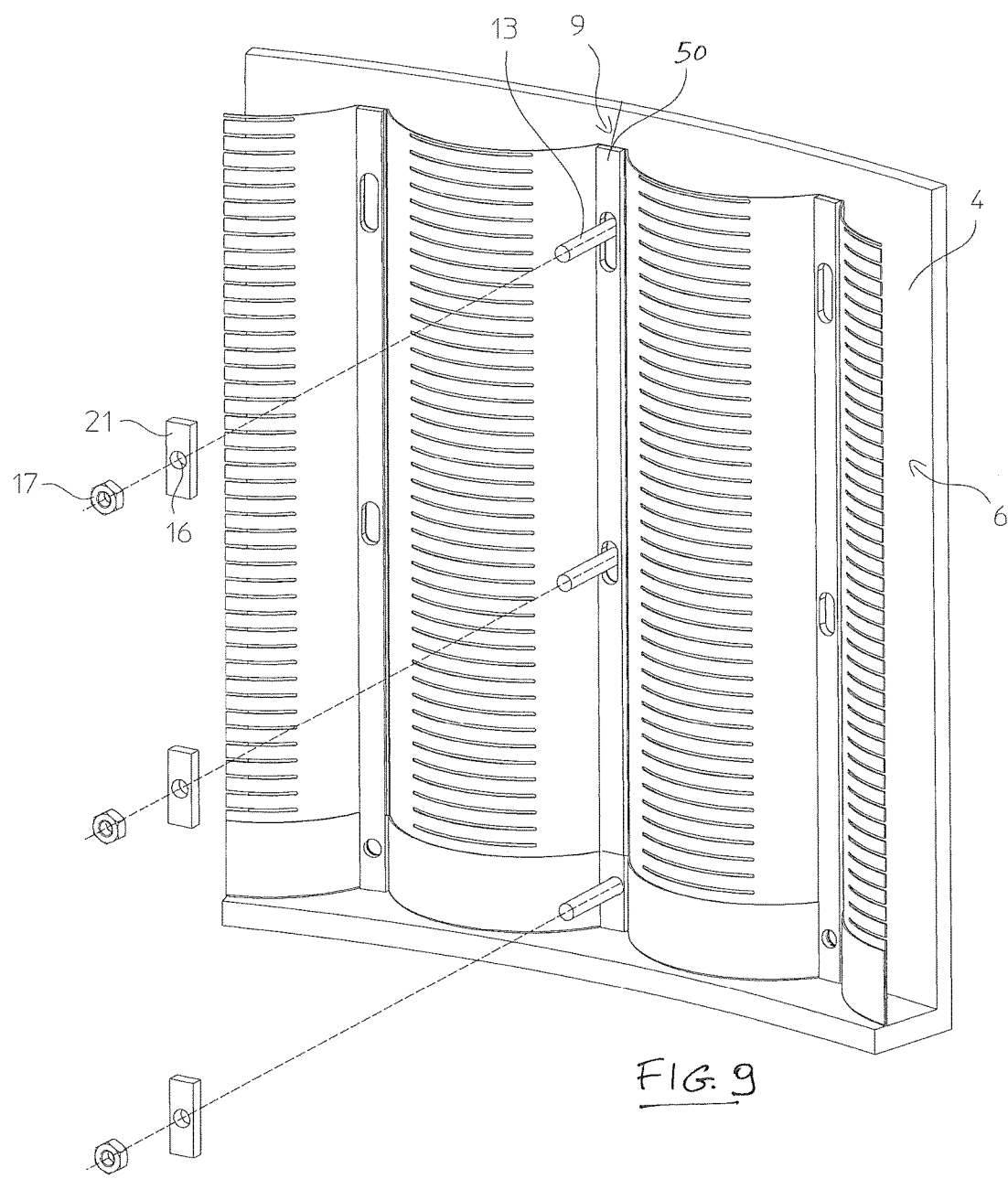
FIG. 9 shows an example of a panel with reinforcements for withstanding the vertical loads.

FIGS. 9 and 10 show a further embodiment which comprises sheet-metal strips 50 arranged in the ribs 9 and designed to reinforce and protect the panels 7 against the danger of instability due to a vertical load. The addition of reinforcing elements for protection against vertical loads is appropriate if the panels are thin and/or if the catalytic bed is considerably long.

It should be noted that a variant of the type shown in FIGS. 9 and 10, including reinforcements against vertical loads, is applicable in an equivalent manner to the various forms of panel all falling within the scope of the invention, such as the embodiments of FIGS. 2-6.

In some embodiments the reactor does not comprise a catalytic cartridge and the gas-permeable wall 6 rests directly on the shell 2. The embodiments of FIGS. 2 to 10 are equally applicable providing that supporting wall 4 illustrated in the figures is replaced by the shell 2.

The assembly procedure comprises essentially the following steps which are described with reference to FIG. 2.

A first panel 7 is positioned bringing the respective rib 9 against the wall 4 and bringing the bottom edge of the panel 7 to rest on the ring 18.

The threaded pins 13 are welded to the wall 4, through the openings 15. This welding operation may be advantageously performed using a capacitive-discharge welder provided with pin-welding gun which allows the head of the pin 13 to be welded to the surface of the wall 4.

The locking wedges 14 are inserted and fixed with the respective nuts. In this way the panel 7 is firmly secured to the wall 4.

The following panels 7 are mounted until the wall 6 around the supporting wall 4 is complete.

The closing joint 30 is made for example in accordance with the scheme of FIG. 7 or another depending on the configuration of the panels 7.

The aforementioned procedure may be carried out in the context of modernization of an existing reactor. In this case the panels 7 are inserted inside the reactor through an available opening, such as a manhole. In view of their small thickness, the panels may be folded and suitably bound so that they can be inserted through the manhole.

What is claimed is:

1. A catalytic chemical reactor comprising a catalytic bed and a gas-permeable wall facing the catalytic bed, wherein:
said gas-permeable wall is an assembly of a plurality of panels and each of said panels extends over an angular sector of said permeable wall;
the gas-permeable wall comprises first wall sectors which bear against a supporting wall adjacent to the gas permeable wall, and second wall sectors which are spaced from said supporting wall, the first sectors and the second sectors alternating with each other along the circumferential extension of the permeable wall;
wherein said supporting wall is cylindrical or substantially cylindrical,
wherein said second wall sectors comprise passages for a gas;
the reactor further comprising local securing means of said gas-permeable wall to said supporting wall, said securing means comprising:
a plurality of supports firmly fixed to the supporting wall and passing through respective openings of the first sectors of the gas-permeable wall;
a respective plurality of locking elements which can be associated with said supports, the panels of the gas-permeable wall being clamped between said supporting wall and said locking elements;
wherein said panels, being fixed together and secured to the supporting wall, form a single wall element which delimits a catalytic bed; and
wherein said gas-permeable wall operates as a gas distributor or collector with respect to a catalytic bed.

2. The reactor according to claim 1, wherein said supporting wall is a shell of said reactor.

3. The reactor according to claim 1, wherein the reactor comprises a catalytic cartridge, said catalytic bed being contained in the cartridge, and said supporting wall being a wall of said cartridge.

4. The reactor according to claim 1, wherein adjacent panels have edges which are at least partially superimposed in the region of the bearing sectors.

5. The reactor according to claim 1, wherein the bearing sectors are formed by reliefs or ribs of the permeable wall.

6. The reactor according to claim 5, said bearing sectors having a V-shaped or trapezoidal cross-section along a sectional plane perpendicular to the axis of the wall.

7. The reactor according to claim 6, wherein said bearing sectors have a V-shaped cross-section which defines a recess for receiving locking elements, and said locking elements have a wedge portion adapted to engage with said recess.

8. The reactor according to claim 1, wherein said bearing sectors comprise a flat surface resting on the supporting wall and the locking elements are formed as flat plates.

9. The reactor according to claim 1, wherein the engagement between the supports fixed to the supporting wall and the respective openings in the bearing sectors of the gas-permeable wall is suitable to allow a movement of the gas-permeable wall with respect to the supporting wall, preferably in an axial direction.

10. The reactor according to claim 1, wherein said supports are threaded pins welded to the supporting wall.

11. The reactor according to claim 1, comprising a plurality of locking elements for each of the bearing sectors, the locking elements of a single bearing sector being aligned along a generatrix of the supporting wall.

12. The reactor according to claim 1, wherein the sectors of the permeable wall have any one of the following configurations: a substantially flat profile, a triangular profile, a curved profile or a circle-arc profile.

13. The reactor according to claim 1, also comprising reinforcing elements of the panels, adapted to withstand the vertical loads, said reinforcements being located preferably in the region of the bearing sectors.

14. A method for realizing a gas-permeable wall inside a chemical reactor, said gas-permeable wall being arranged adjacent to a cylindrical supporting wall of the reactor or of a catalytic cartridge contained in the reactor, and said permeable wall being adapted to form a gas distributor or collector to/from a catalytic bed in the reactor, wherein said permeable wall is an assembly of a plurality of panels, each panel comprising at least a first bearing sector resting on the supporting wall, and a second sector having a perforated surface adapted to passage of gas, wherein the first sector of each panel has a plurality of openings;

and wherein the second sector of each panel is spaced from the supporting wall when the panel rests on said supporting wall, the method comprising at least the steps of:
a) positioning a first panel adjacent to the supporting wall;
b) welding a plurality of pins to the supporting wall through said openings of the bearing sector;
c) inserting suitable locking elements and engaging them on said pins so as to secure the panel to the supporting wall;
d) repeating the above steps for the following panels until the gas-permeable wall is completed, optionally using an element for closing the wall.

* * * * *